US012673499B2

(12) United States Patent
Hayashi et al.

(10) Patent No.: US 12,673,499 B2
(45) Date of Patent: Jul. 7, 2026

(54) TANK HAVING FIRST LIQUID CHAMBER WHOSE PORTION IS POSITIONED REARWARD OF SECOND LIQUID CHAMBER TO INCREASE VOLUME OF THE FIRST LIQUID CHAMBER

(71) Applicant: BROTHER KOGYO KABUSHIKI KAISHA, Nagoya (JP)

(72) Inventors: Masahiro Hayashi, Anjo (JP); Naoya Okazaki, Hashima (JP); Yuma Tanabe, Nagoya (JP); Satoru Oki, Nagoya (JP); Yuji Fukuta, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 126 days.

(21) Appl. No.: 18/390,535

(22) Filed: Dec. 20, 2023

(65) Prior Publication Data

US 2024/0208233 A1 Jun. 27, 2024

(30) Foreign Application Priority Data

Dec. 23, 2022 (JP) ................................ 2022-206265

(51) Int. Cl.
*B41J 2/175* (2006.01)

(52) U.S. Cl.
CPC ....... *B41J 2/17513* (2013.01); *B41J 2/17566* (2013.01); *B41J 2002/17573* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17553; B41J 2/17566; B41J 2002/175; B41J 29/02; B41J 29/13
See application file for complete search history.

(56) References Cited

U.S. PATENT DOCUMENTS 10,668,732 B2 * 6/2020 Yokoi .................. B41J 2/17553
2012/0001990 A1 1/2012 Rittgers et al.
2020/0114650 A1 * 4/2020 Shirono ............... B41J 2/17506
2020/0198355 A1 * 6/2020 Tsuji .................... B41J 2/17553

FOREIGN PATENT DOCUMENTS

JP 2020-163715 A 10/2020

* cited by examiner

*Primary Examiner* — Anh T Vo
(74) *Attorney, Agent, or Firm* — Merchant & Gould P.C.

(57) ABSTRACT

A tank includes: a first liquid chamber for storing first liquid; a first front wall; a first upper wall crossing and extending from the first front wall; a second liquid chamber for storing second liquid; a second front wall; and a second upper wall crossing and extending from the second front wall. The first and second upper walls have first and second injection holes, respectively. The first liquid chamber includes a first space and a second space communicating each other. The first space is aligned with the second liquid chamber in a left-right direction. The second space is aligned with and arranged rearward of the first space and the second liquid chamber. The rear end of the first liquid chamber is positioned rearward of the rear end of the second liquid chamber. The first liquid chamber has a first volume larger than a second volume of the second liquid chamber.

14 Claims, 10 Drawing Sheets

TANK HAVING FIRST LIQUID CHAMBER WHOSE PORTION IS POSITIONED REARWARD OF SECOND LIQUID CHAMBER TO INCREASE VOLUME OF THE FIRST LIQUID CHAMBER

REFERENCE TO RELATED APPLICATIONS

This application claims priority from Japanese Patent Application No. 2022-206265 filed on Dec. 23, 2022. The entire content of the priority application is incorporated herein by reference.

BACKGROUND ART

There has been known a structure according to which a plurality of ink tanks each having an inlet port for ink replenishment is arrayed with each other horizontally. Among the plurality of ink tanks, the ink tank storing black ink has a larger cross-sectional area than other ink tanks.

DESCRIPTION

According to the above-described conventional structure, the ink tank for black ink has a dimension greater than those of the other ink tanks with respect to a direction orthogonal to the direction of the array of ink tanks. According to this structure, conceivably, a void space where no ink can be stored would be generated in the space for accommodating the plurality of ink tanks.

In view of the foregoing, it is an object of the present disclosure to provide a compact tank having multiple liquid chambers with different volumes while ensuring visibility of each liquid chamber.

In order to attain the above and other objects, according to one aspect, the present disclosure provides a tank configured to store first liquid and second liquid to be supplied to a liquid consuming device. The tank includes a first liquid chamber, a first front wall, a first upper wall, a second liquid chamber, a second front wall, and a second upper wall. The first liquid chamber is configured to store the first liquid. The first liquid chamber has a first volume. Through the first front wall, a liquid surface of the first liquid stored in the first liquid chamber is visible from an outside of the tank. The first upper wall extends rearward from the first front wall to cross the first front wall. The first upper wall has a first injection hole in communication with the first liquid chamber. The second liquid chamber is configured to store the second liquid. The second liquid chamber has a second volume. Through the second front wall, a liquid surface of the second liquid stored in the second liquid chamber is visible from the outside of the tank. The second upper wall extends rearward from the second front wall to cross the second front wall. The second upper wall has a second injection hole in communication with the second liquid chamber. The first liquid chamber has a first space and a second space in communication with the first space. The first space is aligned with the second liquid chamber in a left-right direction. The first space is defined at least by the first front wall and the first upper wall. The second space is arranged rearward of both the first space and the second liquid chamber and is aligned therewith in a front-rear direction. The first liquid chamber has a rear end that is positioned rearward of a rear end of the second liquid chamber. The first volume of the first liquid chamber is larger than the second volume of the second liquid chamber.

According to this structure, the liquid surface of the first liquid in the first liquid chamber and the liquid surface of the second liquid in the second liquid chamber can be visible to the user from the front side of the tank. The rear end of the first liquid chamber is positioned further rearward than the rear end of the second rear chamber. Accordingly, the first volume of the first liquid chamber can be easily made greater than the second volume of the second liquid chamber, as long as the first and second liquid chambers have the same width as each other in the left-right direction. Since the first volume is greater than the second volume, the first liquid chamber can store a larger amount of liquid than the second liquid chamber does. Further, since the second space of the first liquid chamber is arranged rearward of the first space and the second liquid chamber, the tank can be made compact in the front-rear direction.

Figure 3:
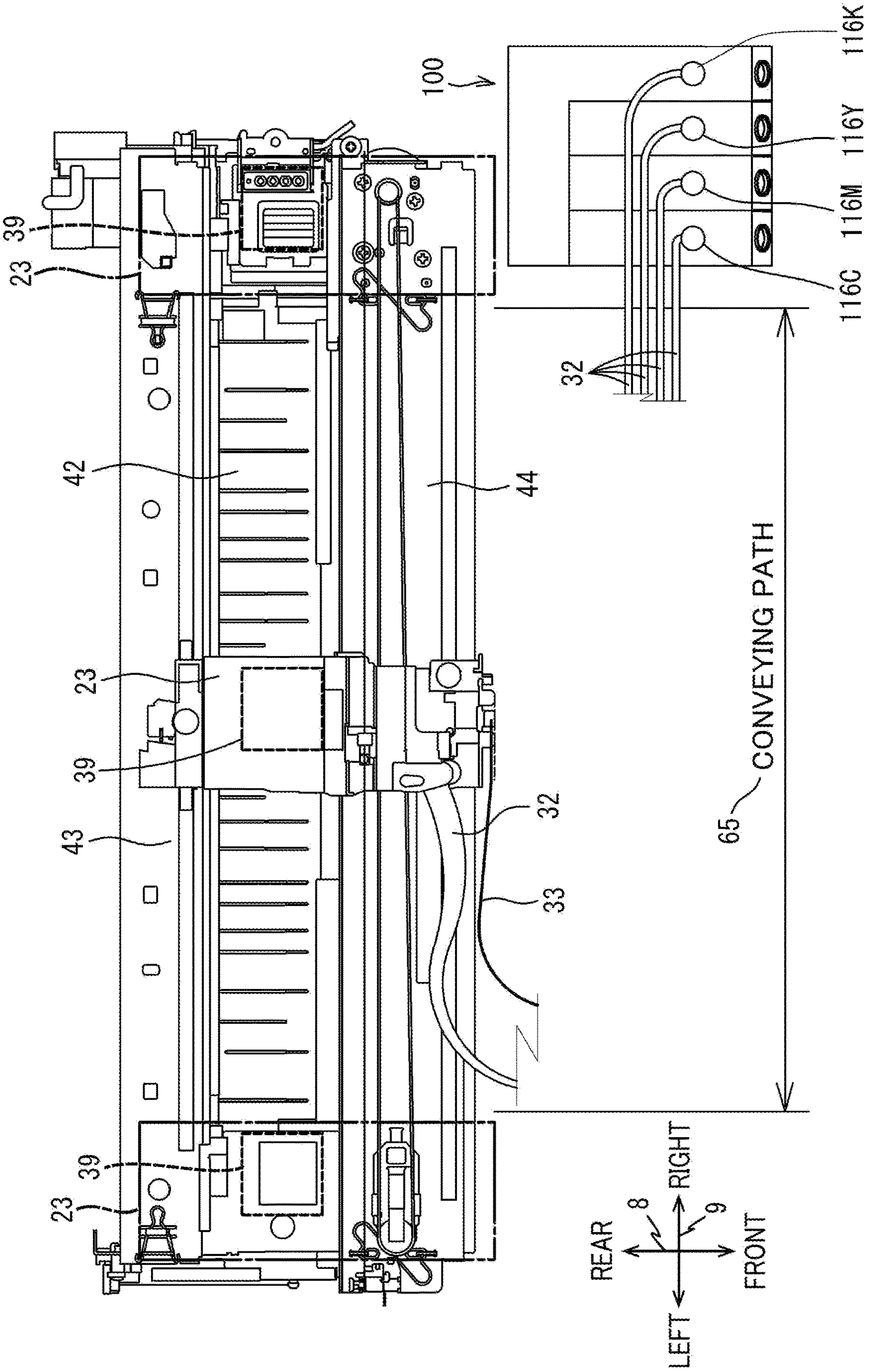

FIG. 3 is a plan view illustrating a layout of a carriage 23 and an ink tank 100 according to one embodiment in the printer portion 11.

Figure 4:
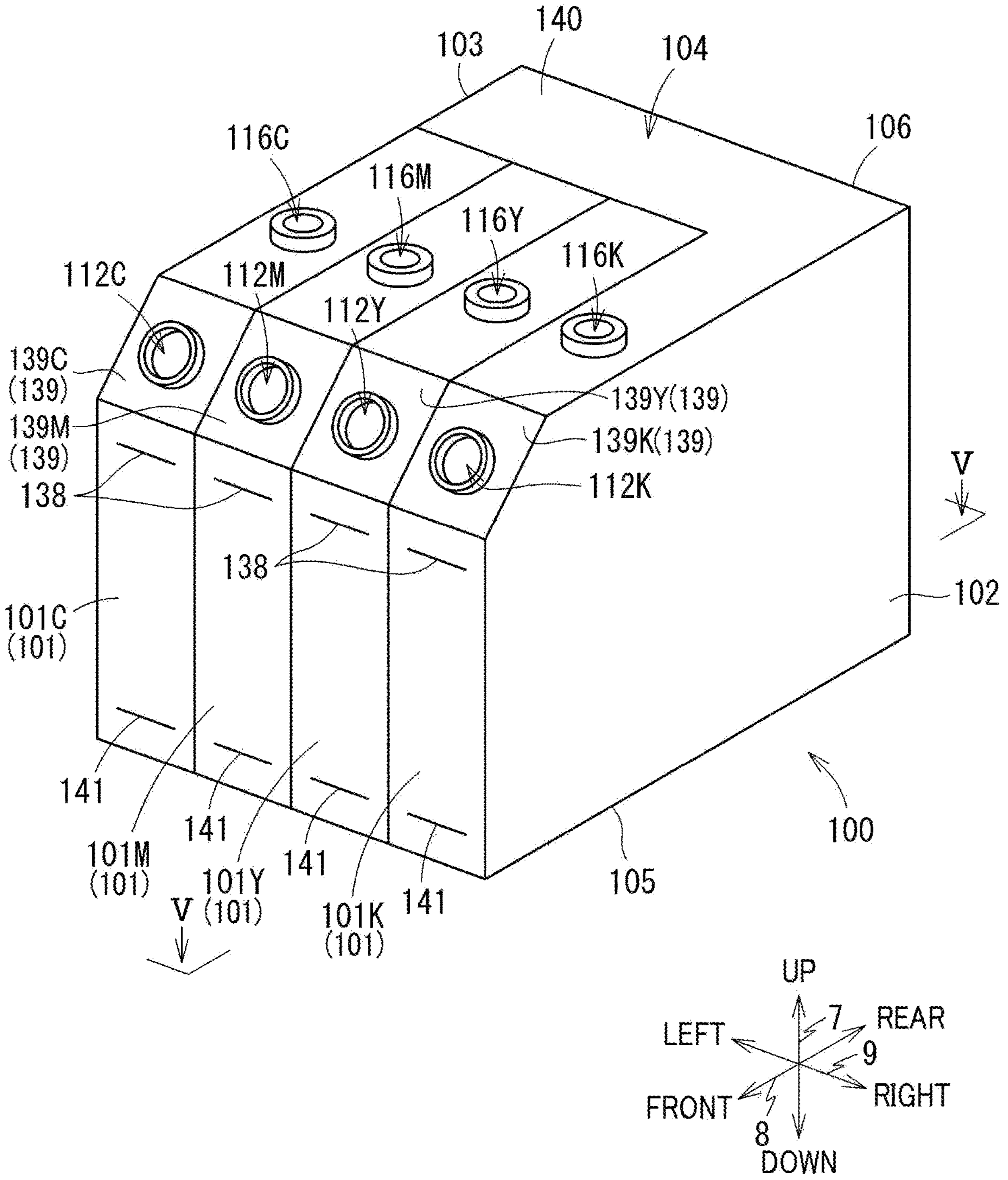

FIG. 4 is a front perspective view of the ink tank 100.

Figure 5:
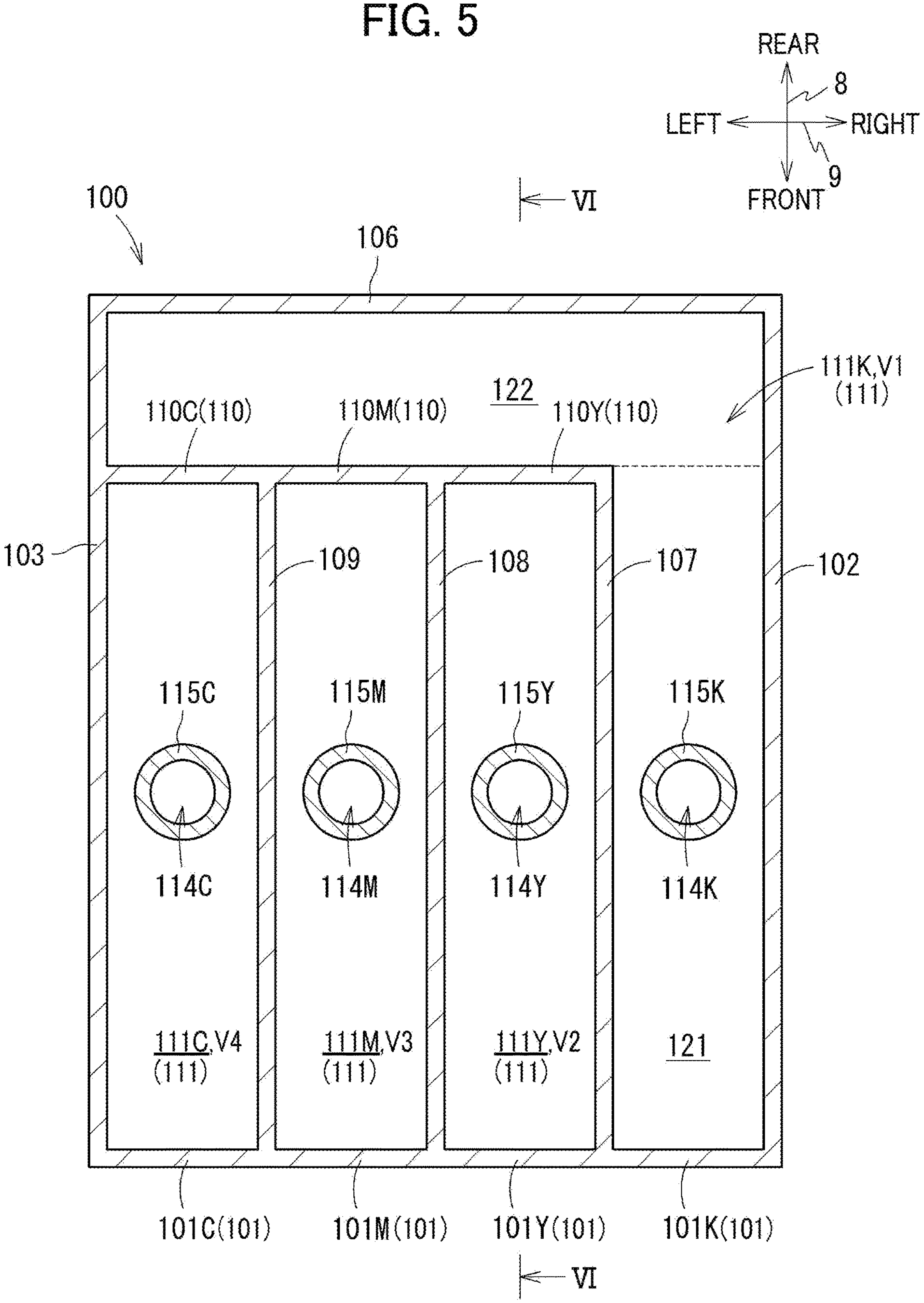

FIG. 5 is a cross-sectional view of the ink tank 100 taken along a line V-V in FIG. 4.

Figure 6:
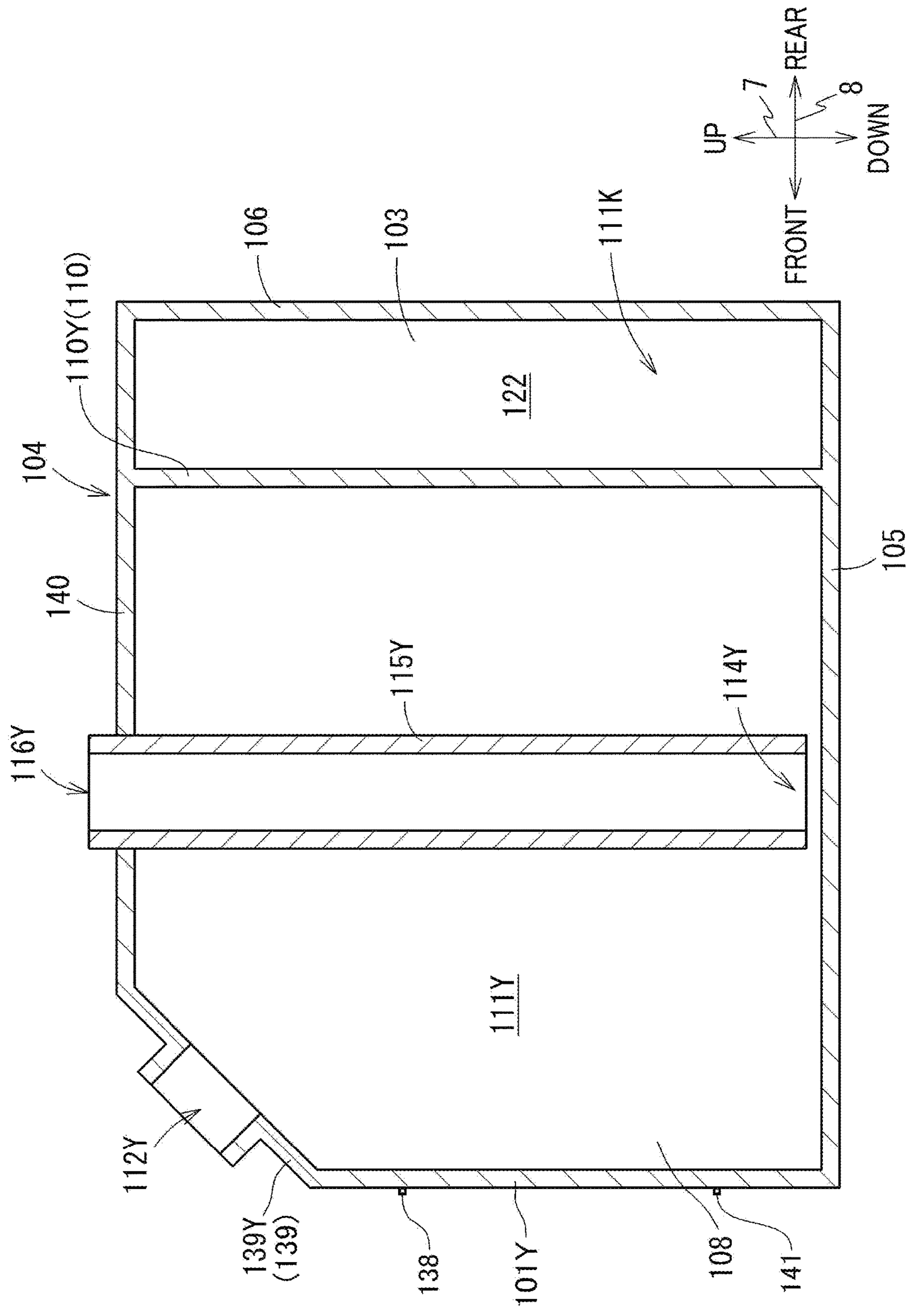

FIG. 6 is a cross-sectional view of the ink tank 100 taken along a line VI-VI in FIG. 5.

Figure 7:
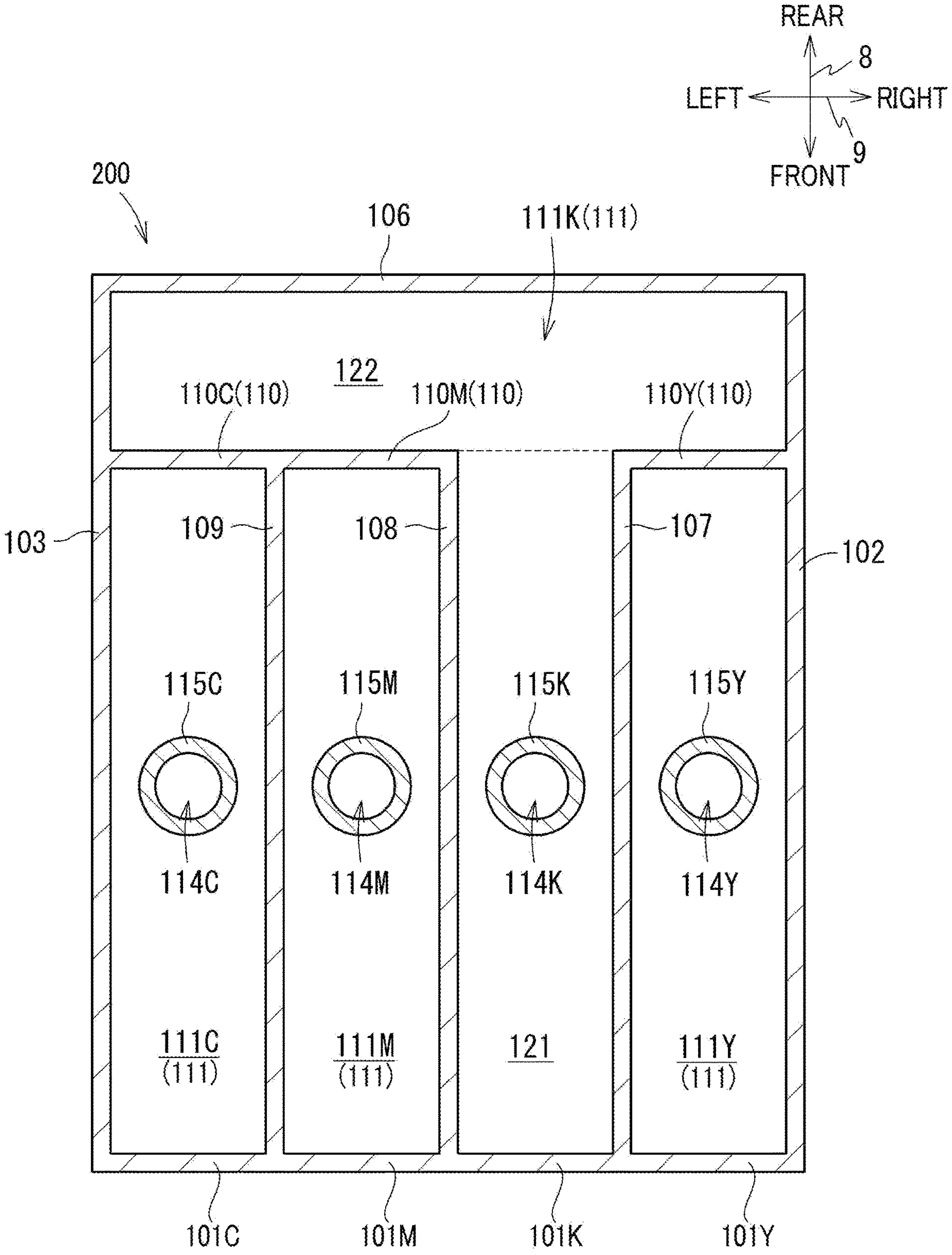

FIG. 7 is a cross-sectional view of an ink tank 200 according to a first modification to the embodiment taken along a line corresponding to the line V-V in FIG. 4.

Figure 8:
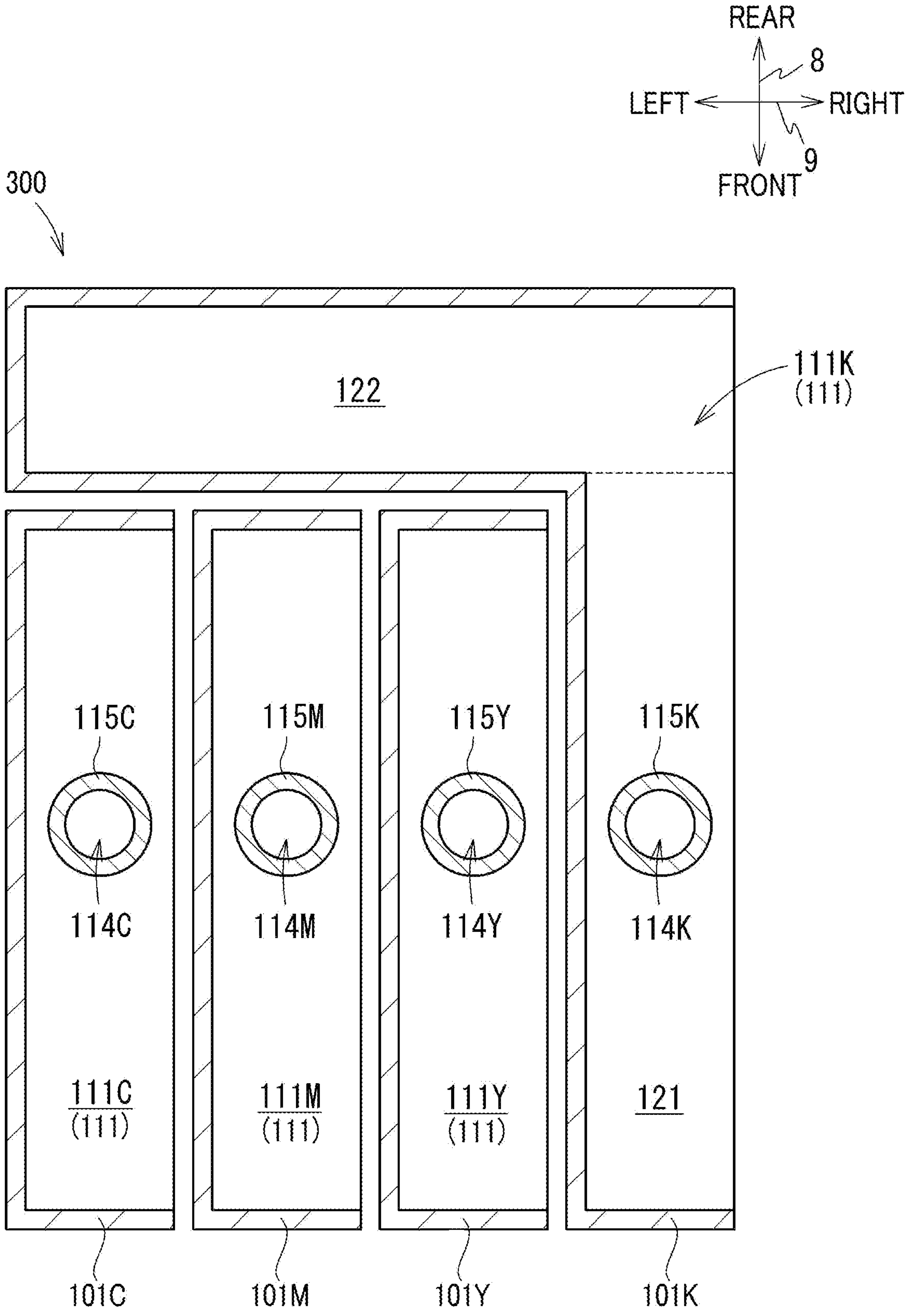

FIG. 8 is a cross-sectional view of an ink tank 300 according to a second modification to the embodiment taken along a line corresponding to the line V-V in FIG. 4.

Figure 9:
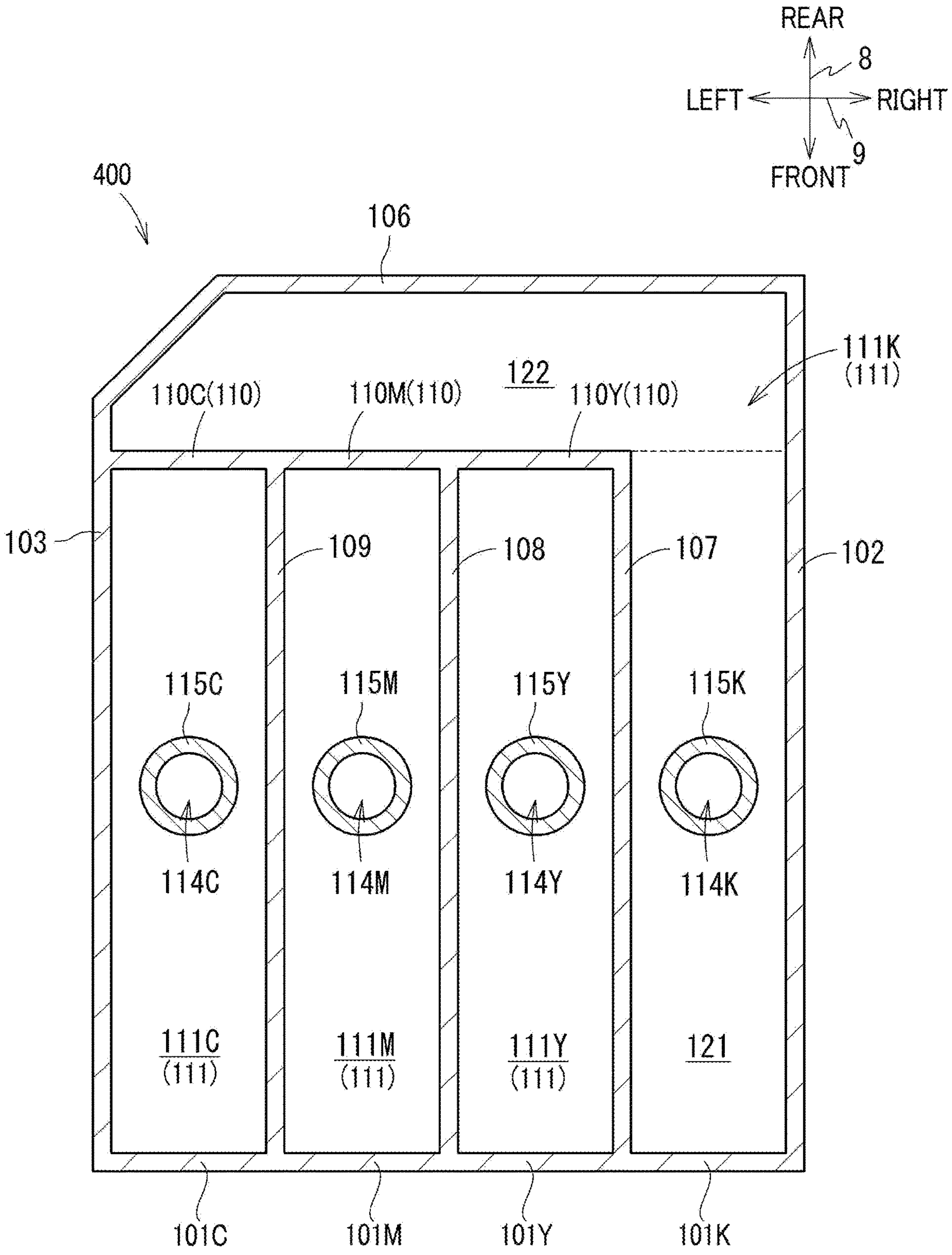

FIG. 9 is a cross-sectional view of an ink tank 400 according to a third modification to the embodiment taken along a line corresponding to the line V-V in FIG. 4.

Figure 10:
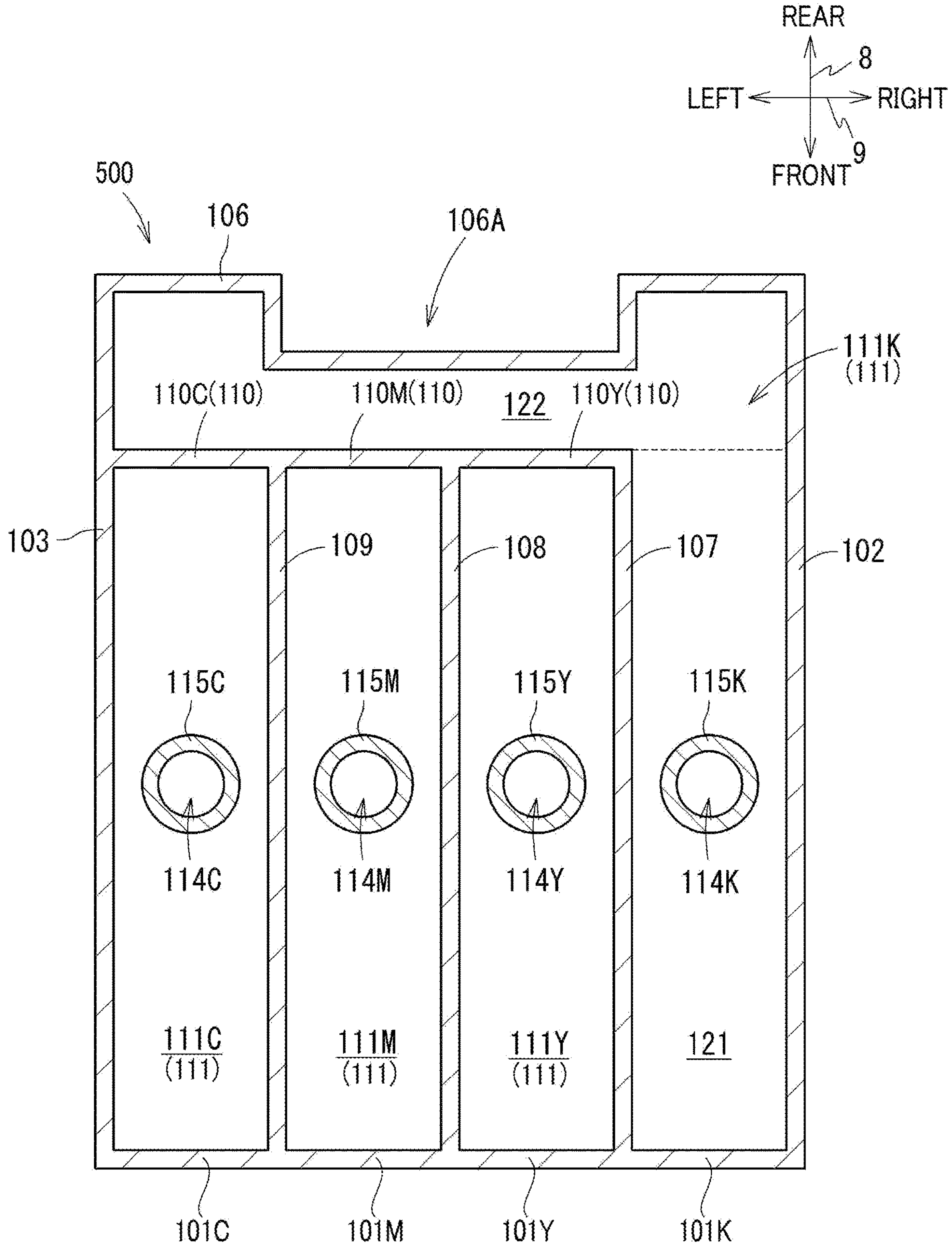

FIG. 10 is a cross-sectional view of an ink tank 500 according to a fourth modification to the embodiment taken along a line corresponding to the line V-V in FIG. 4.

EMBODIMENT

Hereinafter, one embodiment of the present disclosure will be described with reference to FIGS. 1A through 6.

In the following description, each arrow in the drawings advancing from an origin to an end point thereof represents one component of its corresponding direction. Specifically, an upward direction and a downward direction are each one component of an up-down direction 7, and are respectively opposite each other. A leftward direction and a rightward direction are each one component of a left-right direction 9, and are opposite each other. Likewise, a frontward direction and a rearward direction are each one component of a front-rear direction 8, and are respectively opposite each other. In the present embodiment, the up-down direction 7 coincides with a vertical direction, and the front-rear direction 8 and the left-right direction 9 are both horizontal.

Further, in the present disclosure, the up-down direction 7 will be referred to assuming that a multifunction peripheral 10 is placed so as to be operable. Specifically, the multifunction peripheral 10 is assumed to be operable when placed in an orientation or posture illustrated in FIGS. 1A and 1B (will be referred to as "operable orientation" or "operable posture", whenever appropriate). The front-rear direction 8 be referred to assuming that a surface of the multifunction peripheral 10 having an opening 13 (see FIGS. 1A and 1B) is defined as a front surface of the multifunction peripheral 10. The left-right direction 9 be referred to assuming that the multifunction peripheral 10 is viewed from its front side.

Overall Structure of the Multifunction Peripheral 10

Figure 1A:
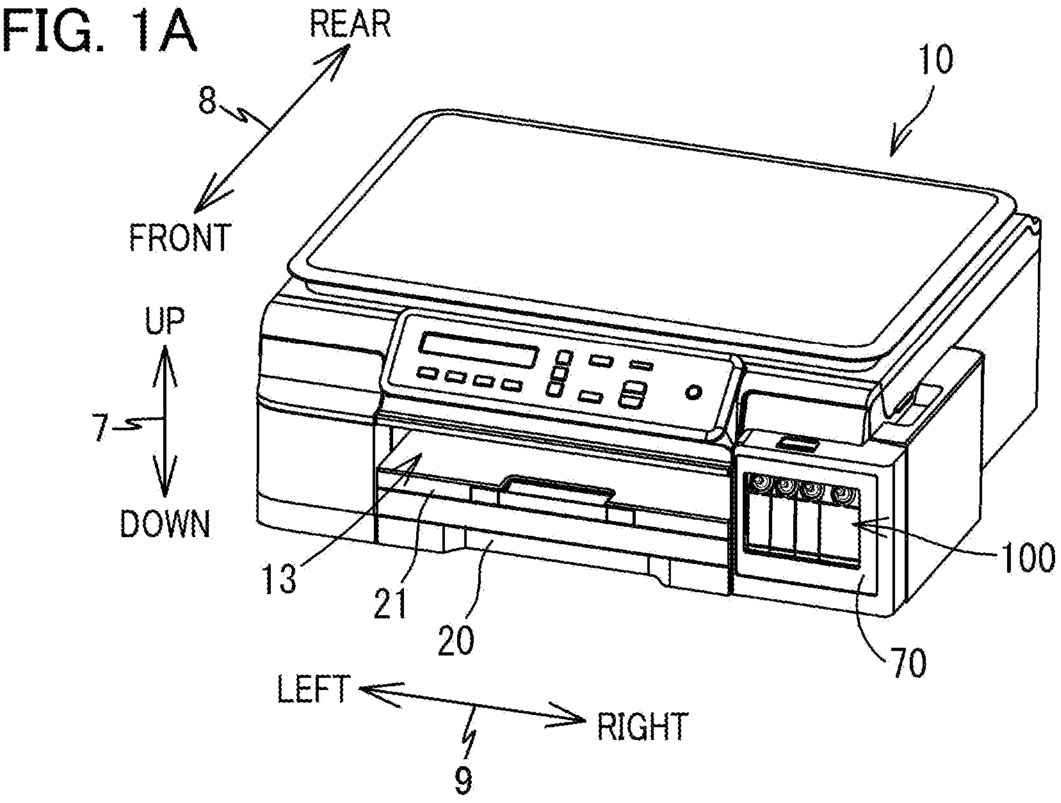
FIG. 1A is a perspective view of a multifunction peripheral 10 in a state where a cover 70 is closed.
Figure 1B:
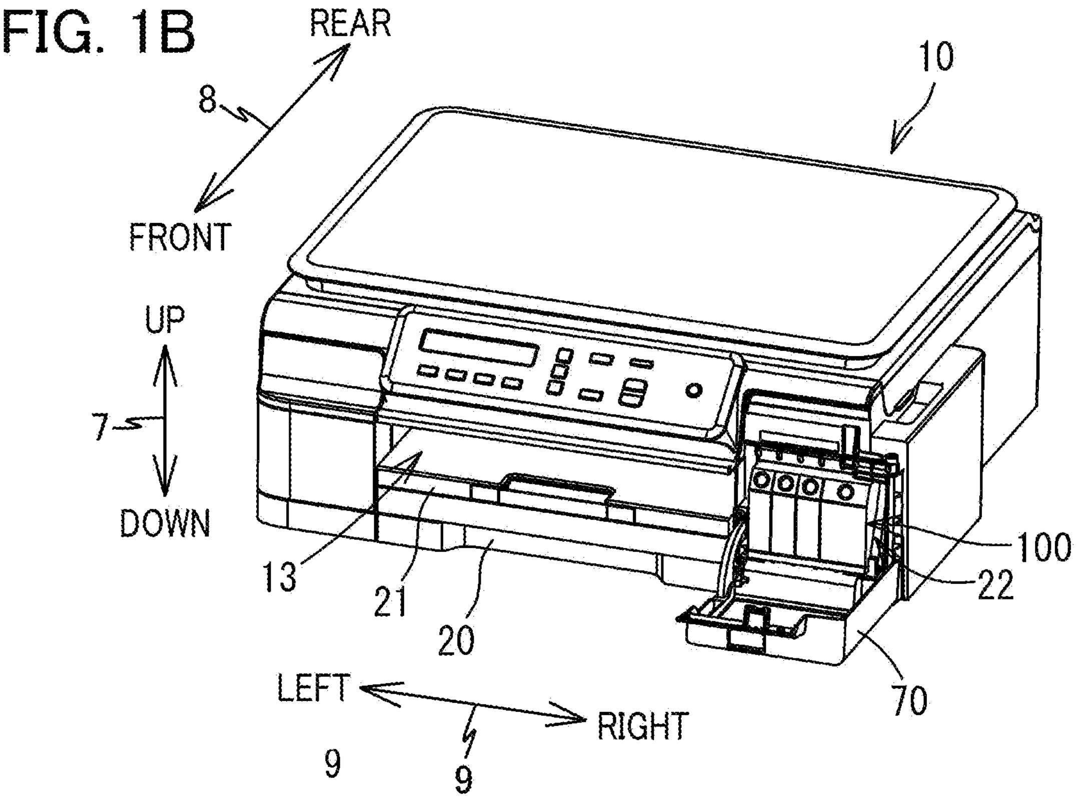
FIG. 1B is a perspective view of the multifunction peripheral 10 in a state where the cover 70 is an opened.

As illustrated in FIGS. 1A and 1B, the multifunction peripheral 10 has an outer shape of a substantially rectangular parallelepiped. The multifunction peripheral 10 has a housing in which a printer portion 11 is provided. The printer portion 11 is positioned in a lower internal portion of the housing. The printer portion 11 is configured to record an image on a sheet 12 (see FIG. 2) in accordance with an inkjet recording method.

Figure 2:
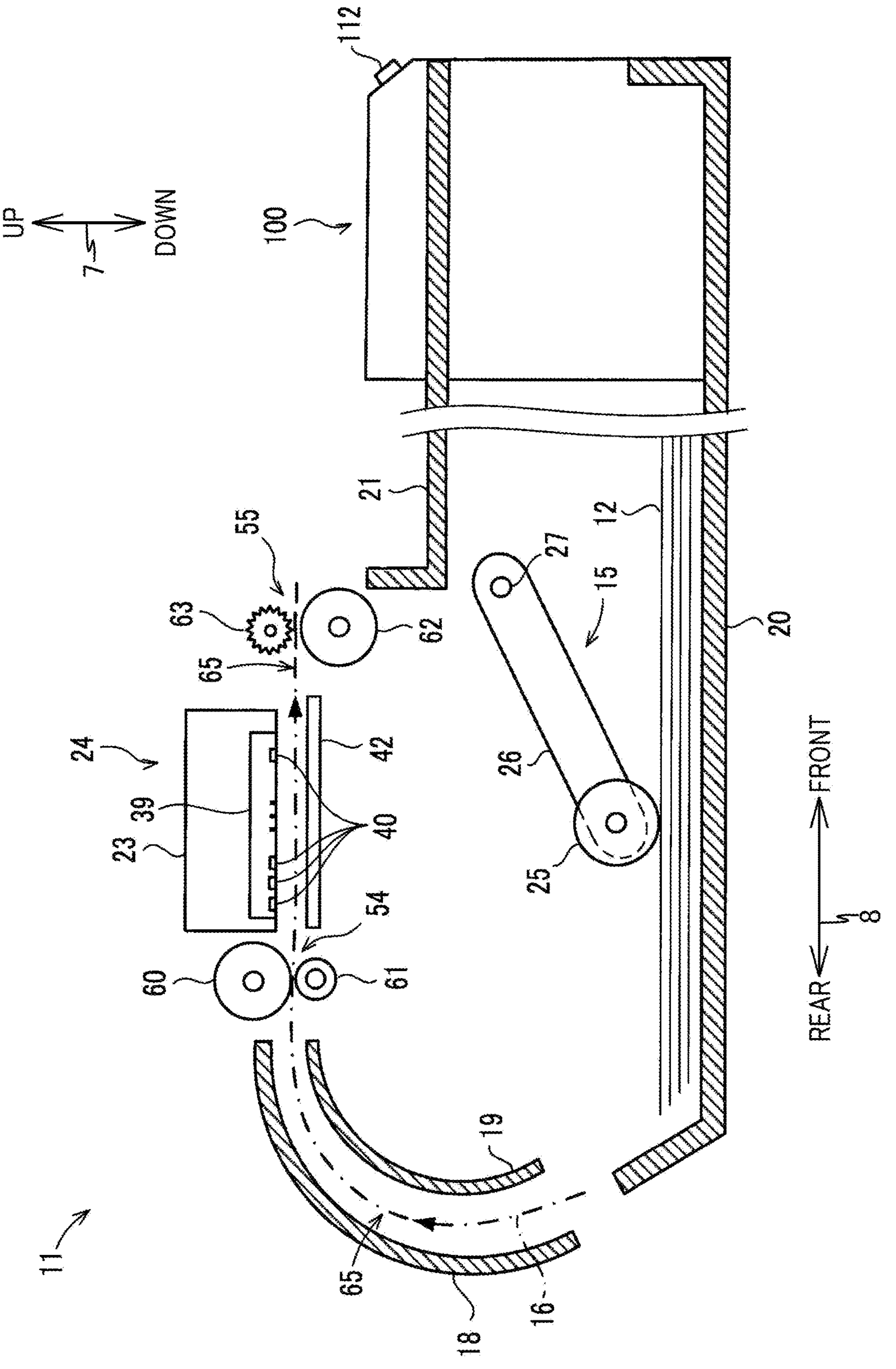
FIG. 2 is a vertical cross-sectional view schematically illustrating an internal configuration of a printer portion 11 of the multifunction peripheral 10.

As illustrated in FIG. 2, the printer portion 11 includes a sheet pick-up unit 15, a sheet tray 20, a discharge tray 21, a feed roller unit 54, a recording portion 24, a discharge roller unit 55, a platen 42, and an ink tank 100 (as an example of a "tank" of the disclosure). The multifunction peripheral 10 has various functions such as a facsimile function and a printing function.

Sheet Tray 20 and Discharge Tray 21

As illustrated in FIGS. 1A and 1B, the opening 13 is formed on the front surface of the multifunction peripheral 10 at a center portion thereof in the left-right direction 9. The sheet tray 20 is movable, relative to the housing, in the front-rear direction 8 through the opening 13 by a user's operation. The sheet tray 20 is configured to support a plurality of the sheets 12 in a stacked state.

The discharge tray 21 is positioned above the sheet tray 20. The discharge tray 21 is movable in the front-rear direction 8 together with the sheet tray 20. The discharge tray 21 is configured to support the sheets 12 discharged by the discharge roller unit 55.

Sheet Pick-Up Unit 15

The sheet pick-up unit 15 is configured to feed each sheet 12 supported on the sheet tray 20 to a conveying path 65. As illustrated in FIG. 2, the sheet pick-up unit 15 includes a pick-up roller 25, a pick-up arm 26, and a shaft 27. The pick-up roller 25 is rotatably supported by a free end portion of the pick-up arm 26. The pick-up roller 25 is configured to rotate to convey the sheet 12 in a sheet conveying direction in response to a driving force of a conveyor motor (not illustrated). Hereinafter, the direction in which the pick-up roller 25, a conveying roller 60, and a discharging roller 62 rotate to convey the sheet 12 in the sheet conveying direction 16 will be referred to as "forward rotation" of these rollers. The pick-up arm 26 is pivotally movable about an axis of the shaft 27 that is supported by a frame (not illustrated) of the printer portion 11. The pick-up arm 26 is urged, by its own weight or by a resiliently urging force of a spring (not illustrated), such that the pick-up arm 26 is pivotable toward the sheet tray 20.

Conveying Path 65

As illustrated in FIG. 2, the conveying path 65 is defined inside the printer portion 11. The conveying path 65 is a space defined by, for example, an outer guide member 18 and an inner guide member 19 arranged to oppose each other with a predetermined gap therebetween. The conveying path 65 extends upward and rearward from a rear end portion of the sheet tray 20, then makes a U-turn to extend frontward through a space between the recording portion 24 and the platen 42, and finally reaches the discharge tray 21. As illustrated in FIGS. 2 and 3, a portion of the conveying path 65 between the feed roller unit 54 and the discharge roller unit 55 is positioned substantially at a center portion of the multifunction peripheral 10 in the left-right direction 9 and extends in the front-rear direction 8. The sheet conveying direction 16 for each sheet 12 in the conveying path 65 is indicated by a dotted-chain-line arrow in FIG. 2.

Feed Roller Unit 54

As illustrated in FIG. 2, the feed roller unit 54 is positioned upstream of the recording portion 24 in the sheet conveying direction 16. The feed roller unit 54 includes the conveying roller 60 and a pinch roller 61 positioned to oppose each other in the up-down direction 7. The conveying roller 60 is configured to rotate upon receipt of a driving force of the conveyor motor. The pinch roller 61 is configured to rotate following the rotation of the conveying roller 60. As the conveying roller 60 rotates in the forward direction in response to the forward rotation of the conveyor motor, each sheet 12 is configured to be conveyed in the sheet conveying direction 16 while being nipped between the conveying roller 60 and the pinch roller 61.

Discharge Roller Unit 55

As illustrated in FIG. 2, the discharge roller unit 55 is positioned downstream relative to the recording portion 24 in the sheet conveying direction 16. The discharge roller unit 55 includes the discharging roller 62 and a spur 63 positioned to oppose each other in the up-down direction 7. The discharging roller 62 is configured to rotate by the driving force of the conveyor motor. The spur 63 is configured to rotate following the rotation of the discharging roller 62. As the discharging roller 62 rotates forward by the forward rotation of the conveyor motor, each sheet 12 is configured to be conveyed in the sheet conveying direction 16 while being nipped between the discharging roller 62 and the spur 63.

Recording Portion 24

As illustrated in FIG. 2, the recording portion 24 is positioned between the feed roller unit 54 and the discharge roller unit 55 in the sheet conveying direction 16. The recording portion 24 is positioned opposite the platen 42 with respect to the conveying path 65 in the up-down direction 7. The recording portion 24 is positioned above the conveying path 65 in the up-down direction 7. The recording portion 24 includes a carriage 23 and a recording head 39.

As illustrated in FIG. 3, the carriage 23 is supported by guide rails 43 and 44. The guide rails 43 and 44 are supported by the frame (not illustrated) of the printer portion 11. The guide rails 43 and 44 extend in the left-right direction 9 and are spaced apart from each other in the front-rear direction 8. The carriage 23 is connected to a well-known belt mechanism provided at the guide rail 44. The belt mechanism is configured to be driven by a carriage-driving motor (not illustrated). The carriage 23 is configured to move reciprocatingly in the left-right direction 9 in response to circular movement of the belt mechanism. The carriage 23 is configured to move, with respect to the left-right direction 9, in a prescribed range which is indicated by one-dotted chain lines in FIG. 3. Specifically, the carriage 23 is movable in the left-right direction 9 in such a range that: up to a point beyond a right end of the conveying path 65 in the rightward direction, and up to a point beyond a left end of the conveying path 65 in the leftward direction.

As illustrated in FIG. 3, the recording head 39 is connected to the ink tank 100 through four ink tubes 32. The recording head 39 is electrically connected, through a flexible flat cable 33, to a control board (not illustrated) on which a controller (not illustrated) is surface-mounted. The four ink tubes 32 and the flexible flat cable 33 respectively extend from the carriage 23. The four ink tubes 32 allow ink stored in the ink tank 100 to be supplied to the recording head 39. Specifically, the four ink tubes 32 respectively corresponding to four colors of ink (black, magenta, cyan and yellow) extend from the ink tank 100 and are connected to the recording head 39. Hereinafter, the ink tubes corresponding to the four colors of ink (black, magenta, cyan and yellow) will be referred to as ink tubes 32B, 32M, 32C, and 32Y, respectively, and, whenever appropriate, these ink tubes 32B, 32M, 32C, and 32Y will be collectively referred to as "ink tubes 32." The flexible flat cable 33 is configured to transmit control signals outputted from the controller to the recording head 39.

As illustrated in FIG. 2, the recording head 39 is mounted on the carriage 23. The recording head 39 has a lower surface formed with a plurality of nozzles 40. Hereafter, the lower surface of the recording head 39 where the plurality of nozzles 40 is positioned will be referred to as a "nozzle surface" wherever necessary. The recording head 39 is configured to eject ink as minute ink droplets through the nozzles 40. While the carriage 23 moves reciprocatingly in the left-right direction 9, the recording head 39 ejects ink droplets, through the nozzles 40, onto the sheet 12 supported by the platen 42. In this way, an image is recorded on each sheet 12.

Platen 42

As illustrated in FIG. 2, the platen 42 is positioned between the feed roller unit 54 and the discharge roller unit 55 in the sheet conveying direction 16. The platen 42 is positioned to oppose the recording portion 24 in the up-down direction 7. The platen 42 supports the sheet 12 conveyed by the feed roller unit 54 from below.

Ink Tank 100

As illustrated in FIGS. 1A and 1B, the ink tank 100 is positioned in an interior of the multifunction peripheral 10. The ink tank 100 is fixed to the multifunction peripheral 10 such that the ink tank 100 cannot be easily removed from the multifunction peripheral 10. An opening 22 is formed in a front surface of the housing of the multifunction peripheral 10 at a right end portion thereof. The ink tank 100 is positioned rearward of the opening 22. A cover 70 is provided for covering the opening 22. The cover 70 is pivotally movable about a pivot axis extending in the left-right direction 9 at a lower end of the cover 70. The cover 70 is pivotable between a closed position for covering the opening 22 (illustrated in FIG. 1A) and an open position for exposing the opening 22 to an outside (illustrated in FIG. 1B).

As illustrated in FIG. 4, the ink tank 100 has a substantially rectangular parallelepiped shape. The ink tank 100 includes a front wall 101, a right wall 102, a left wall 103, an upper wall 104, a lower wall 105, and a rear wall 106. The ink tank 100 is integrally molded through injection molding with resin, for example. Among the walls constituting an outer shell of the ink tank 100, the lower wall 105, for example, may be molded separately from other walls. The front wall 101, the right wall 102, the left wall 103, the upper wall 104, the lower wall 105, and the rear wall 106 are light transmissive so that a user can visually confirm a level of the ink stored in the ink tank 100 from the outside.

As illustrated in FIG. 4, upper limit indicator lines 138 and lower limit indicator lines 141 are provided on the front wall 101. The upper limit indicator lines 138 and the lower limit indicator lines 141 are formed to protrude frontward from an outer surface of the front wall 101. Each upper limit indicator line 138 indicates an upper limit position of the ink stored in a corresponding one of ink chambers 111 of the ink tank 100. Each upper limit indicator line 138 extends linearly in the left-right direction 9. Each lower limit indicator line 141 indicates a lower limit position of the ink stored in a corresponding ink chamber 111. The lower limit indicator line 141 extends linearly in the left-right direction 9. The upper limit indicator line 138 is an example of an "upper limit indicator" of the disclosure, and the lower limit indicator line 141 is an example of a "lower limit indicator" of the disclosure.

As illustrated in FIG. 1A, the cover 70 has a center portion formed with an opening penetrating throughout a thickness of the cover 70. The upper limit indicator lines 138 and the lower limit indicator lines 141 are visible from the outside of the multifunction peripheral 10 through the opening of the cover 70 when the cover 70 is at the closed position.

As illustrated in FIG. 4, the upper wall 104 includes an inclined wall 139 and a sub upper wall 140. The inclined wall 139 extends diagonally rearward and upward from a top edge of the front wall 101 to cross the outer surface of the front wall 101. The sub upper wall 140 extends in the front-rear direction 8 toward the rear from a rear end of the inclined wall 139 so as to be connected to the rear wall 106. The inclined wall 139 extends in a direction crossing an outer surface of the sub upper wall 140. The sub upper wall 140 has a generally flat plate shape extending in the front-rear direction 8 and the left-right direction 9.

As illustrated in FIG. 5, the ink tank 100 defines therein an internal space that is partitioned into four ink chambers 111 by partition walls 107, 108, 109, and 110. The four ink chambers 111 are aligned with one another in the left-right direction 9. Incidentally, in FIG. 4, parts corresponding to the partition walls 107, 108, 109, and 110 defining the ink chambers 111 are shown by solid lines on an outer surface of the ink tank 100. However, these solid lines may not appear on the outer surface of the ink tank 100.

The four ink chambers 111 respectively store ink of four different colors, namely, cyan (C), magenta (M), yellow (Y) and black (K). Hereinafter, the four ink chambers 111 may be referred to as ink chambers 111C, 111M, 111Y and 111K, respectively, according to the four colors of the stored ink. Further, hereinafter, portions of the front wall 101 corresponding to the respective ink chambers 111C, 111M, 111Y and 111K will be referred to as front walls 101C, 101M, 101Y, and 101K, respectively. Similarly, portions of the inclined wall 139 corresponding to the ink chambers 111C, 111M, 111Y and 111K will be referred to as inclined walls 139C, 139M, 139Y and 139K, respectively. The inclined wall 139K is an example of a "first upper wall" of the disclosure. The inclined wall 139Y is an example of a "second upper wall" of the disclosure. The inclined wall 139M is an example of a "third upper wall" of the disclosure.

The front wall 101K and front wall 101Y are arranged adjacent to each other in the left-right direction 9. In the same manner, the front wall 101Y and front wall 101M are arranged adjacent to each other in the left-right direction 9. Here, "the front walls are arranged adjacent to each other in the left-right direction 9" means that the front walls are positioned adjacent to each other (side by side) in the left-right direction 9, but does not mean that these front walls are at the same position as each other in the front-rear direction 8. Further, "the front walls are arranged adjacent to each other in the left-right direction 9" does not necessarily mean that the front walls should be in contact with each other, but a space may be available between the neighboring front walls in the left-right direction 9. That is, "the front walls 101K and 101Y are arranged adjacent to each other in the left-right direction 9" represents that the front wall 101K and front wall 101Y are aligned with each other in the left-right direction 9 without any component interposed therebetween. Accordingly, in this example, the front wall 101K and the front wall 101Y may be at different positions relative to each other in the front-rear direction 8, provided that the front wall 101K and the front wall 101Y are arranged adjacent to each other in the left-right direction 9. Likewise, the front wall 101Y and the front wall 101M may have different positions relative to each other in the front-rear direction 8, provided that the front wall 101Y and the front wall 101M are arranged adjacent to each other in the left-right direction 9.

As illustrated in FIG. 5, the partition walls 107, 108, 109, and 110 are positioned inside the ink tank 100 to define the ink chambers 111K, 111Y, 111M and 111C. The partition walls 107, 108, and 109 have each a generally flat plate shape extending in the up-down direction 7 and the front-rear direction 8. The partition walls 107, 108, and 109 are arranged at regular intervals in the left-right direction 9 between the right wall 102 and the left wall 103. The partition walls 107, 108, and 109 have front ends each connected to the front wall 101. The partition walls 107, 108, and 109 have upper ends each connected to the upper wall 104 (both the inclined wall 139 and the sub upper wall 140). The partition walls 107, 108, and 109 have lower ends each connected to the lower wall 105. The lower wall 105 has a generally flat plate shape extending in the front-rear direction 8 and the left-right direction 9.

The partition wall 110 has a generally flat plate shape extending in the up-down direction 7 and the left-right direction 9. The partition wall 110 is positioned between the front wall 101 and the rear wall 106 in the front-rear direction 8. The partition wall 110 has an upper end connected to the sub upper wall 140 of the upper wall 104. The partition wall 110 has a lower end connected to the lower wall 105. The partition wall 110 has a right end connected to a rear end of the partition wall 107. The partition wall 110 has a left end connected to the left wall 103. The partition wall 110 is also connected to respective rear ends of the partition walls 108 and 109.

The ink chamber 111C is positioned at a left end in the internal space of the ink tank 100. The ink chamber 111C stores ink of the color of cyan. The ink chamber 111C is a space defined by the front wall 101C, the inclined wall 139C, the sub upper wall 140, the left wall 103, the lower wall 105, the partition wall 109, and the partition wall 110. The ink chamber 111C has a substantially rectangular cross-section, as illustrated in FIG. 5.

The ink chamber 111M is positioned adjacent to and rightward of the ink chamber 111C. The ink chamber 111M stores ink of the color of magenta. The ink chamber 111M is a space defined by the front wall 101M, the inclined wall 139M, the sub upper wall 140, the lower wall 105, the partition wall 108, the partition wall 109, and the partition wall 110. The ink chamber 111M has a substantially rectangular cross-section, as illustrated in FIG. 5. The magenta ink is an example of "third liquid" of the disclosure. The ink chamber 111M is an example of a "third liquid chamber" of the disclosure. The front wall 101M is an example of a "third front wall" of the disclosure.

The ink chamber 111Y is positioned adjacent to and rightward of the ink chamber 111M. The ink chamber 111Y stores ink of the color of yellow. The ink chamber 111M is a space defined by the front wall 101Y, the inclined wall 139Y, the sub upper wall 140, the lower wall 105, the partition wall 107, the partition wall 108, and the partition wall 110. The ink chamber 111Y has a substantially rectangular cross-section, as illustrated in FIG. 5. The yellow ink is an example of "second liquid" of the disclosure. The ink chamber 111Y is an example of a "second liquid chamber" of the disclosure. The front wall 101Y is an example of a "second front wall" of the disclosure. The partition wall 108 is an example of a "third partition wall" of the disclosure.

The ink chamber 111K is positioned at a right end in the internal space of the ink tank 100 with respect to the left-right direction 9. The ink chamber 111K is also positioned at a rear end in the internal space of the ink tank 100 with respect to the front-rear direction 8. The ink chamber 111K stores ink of the color of black. The ink chamber 111K is a space defined by the front wall 101K, the inclined wall 139K, the sub upper wall 140, the right wall 102, the lower wall 105, the rear wall 106, the partition wall 107, and the partition wall 110. The ink chamber 111K has a substantially L-shaped cross-section, as illustrated in FIG. 5. The black ink is an example of "first liquid" of the disclosure. The ink chamber 111K is an example of a "first liquid chamber" of the disclosure. The front wall 101K is an example of a "first front wall" of the disclosure. The partition wall 107 is an example of a "first partition wall" of the disclosure. The partition wall 110 is an example of a "second partition wall" of the disclosure.

The ink chamber 111K has a rear end positioned further rearward than respective rear ends of the ink chambers 111C, 111M, and 111Y. Specifically, the ink chamber 111K has a first space 121 and a second space 122. The first space 121 is positioned forward of the second space 122 in the front-rear direction 8. The first space 121 is defined by the front wall 101K, the inclined wall 139K, the sub upper wall 140, the right wall 102, the lower wall 105, and the partition wall 107. The first space 121 has an open rear end that is not partitioned by any wall (in FIG. 5, the rear end of the first space 121 is indicated by a dotted line). The first space 121 and the ink chamber 111Y are positioned adjacent to each other in the left-right direction 9. In other words, the ink chamber 111Y is positioned between the ink chamber 111M and the first space 121 in the left-right direction 9. The first space 121 has a dimension in the front-rear direction 8 that is equal to dimensions in the front-rear direction 8 of the ink chambers 111C, 111M, and 111Y, based on an assumption that the thickness of the partition wall 110 is not taken into consideration.

The second space 122 is positioned rearward of the first space 121. The first space 121 and the second space 122 are in communication with each other. The second space 122 is defined by the sub upper wall 140, the right wall 102, the left wall 103, the lower wall 105, the rear wall 106 and the partition wall 110. The second space 122 is positioned rearward of the ink chambers 111C, 111M, and 111Y. The second space 122 is positioned adjacent to each of the ink chambers 111C, 111M, and 111Y in the front-rear direction 8.

The ink chamber 111K has a volume V1 that is larger than a volume V2 of the ink chamber 111Y due to the presence of the second space 122 in the ink chamber 111K (V1>V2). Likewise, the volume V1 of the ink chamber 111K is greater than a volume V3 of the ink chamber 111M (V1>V3). The volume V1 of the ink chamber 111K is greater than a volume V4 of the ink chamber 111C (V1>V4). The volume V1 is an example of a "first volume", the volume V2 is an example of a "second volume", and the volume V3 is an example of a "third volume".

When viewed in the front-rear direction 8, the second space 122 of the ink chamber 111K extends in the left-right direction 9 to span across left and right ends of the partition wall 110. Accordingly, the second space 122 extends in the left-right direction 9 to span across right and left ends of a portion of the partition wall 110 that defines the rear end of the ink chamber 111Y. Likewise, the second space 122 extends in the left-right direction 9 to span across right and left ends of another portion of the partition wall 110 that defines the rear end of the ink chamber 111M, and right and left ends of a remaining portion of the partition wall 110 that defines the rear end of the ink chamber 111C. Hereinafter, as a matter of convenience, these portions of the partition wall 110 defining the rear ends of the respective ink chambers 111Y, 111M, and 111C may be referred to as partition portions 110Y, 110M and 110C, respectively, whenever appropriate. That is, the partition portions 110Y, 110M, and 110C function as rear walls of the respective ink chambers 111Y, 111M and 111C.

The second space 122 has a portion (space) that is positioned above the upper limit indicator lines 138. The second space 122 also has a portion (space) that is positioned below the lower limit indicator lines 141.

The upper wall 104 of the ink tank 100 is provided with four injection holes 112 for injecting ink into each of the four ink chambers 111. Specifically, the injection holes 112 (112C, 112M, 112Y, 112K) are formed in the inclined wall 139 of the upper wall 104. Each injection hole 112 penetrates through the inclined wall 139 in a thickness direction thereof to allow communication of the corresponding ink chamber 111 with the outside of the tank 100. More specifically, the injection hole 112C is provided at the inclined wall 139C. The injection hole 112M is provided at the inclined wall 139M. The injection hole 112Y is provided at the inclined wall 139Y. The injection hole 112K is provided at the inclined wall 139K. The injection hole 112K is an example of a "first injection hole" of the disclosure, the injection hole 112Y is an example of a "second injection hole" of the disclosure, and the injection hole 112M is an example of a "third injection hole" of the disclosure.

As illustrated in FIG. 1B, when the cover 70 is at the open position, each injection hole 112 provided at the inclined wall 139 is exposed to the outside of the multifunction peripheral 10. When a user inserts a nozzle of an ink bottle into a corresponding one of the injection holes 112, ink in the ink bottle can be introduced into the corresponding ink chamber 111 through the injection hole 112. Incidentally, a cap may be provided at each injection hole 112 for opening and closing the injection hole 112.

As illustrated in FIG. 5, in the internal space of the ink tank 100, four ink outlet ports 114 are provided one in each ink chamber 111. The four outlet ports 114 (114C, 114M, 114Y, 114K) are openings to allow ink stored in respective ink chambers 111 (111C, 111M, 111Y, 111K) to be discharged to the outside of the tank 100. Specifically, among the four outlet ports 114, the ink outlet port 114C corresponding to the ink chamber 111C is positioned leftmost at the sub upper wall 140. The outlet port 114M corresponding to the ink chamber 111M is positioned rightward of the ink outlet port 114C. The outlet port 114Y corresponding to the ink chamber 111Y is positioned rightward of the ink outlet port 114M. The outlet port 114K corresponding to the ink chamber 111K is positioned rightmost at the sub upper wall 140. The ink outlet port 114K is an example of a "first outlet port" of the disclosure, and the ink outlet port 114Y is an example of a "second outlet port" of the disclosure.

The ink outlet ports 114 have a generally similar configuration as one another, except respective positions in the left-right direction 9. Hence, hereinafter, the ink outlet port 114Y corresponding to the ink chamber 111Y will be described, while description on the remaining ink outlet ports 114C, 114M, and 114K will be omitted to avoid duplicating description.

As illustrated in FIG. 6, an outflow tube 115Y is provided on the sub upper wall 140 at a position corresponding to the ink chamber 111Y. The outflow tube 115Y is a hollow cylindrical tube extending in the up-down direction 7. The outflow tube 115Y penetrates through the sub upper wall 140 in the up-down direction 7. The outflow tube 115Y has a lower open end that is positioned near the lower wall 105 inside the ink chamber 111Y. This lower open end of the ink outflow tube 115Y is the ink outlet port 114Y. The outflow tube 115Y has an open upper end that is positioned outside of the ink chamber 111Y. The open upper end of the outflow tube 115Y functions as a connection port 116Y. A corresponding one of the ink tubes 32 (ink tube 32Y) is connected to the connection port 116Y.

Similarly, as illustrated in FIG. 5, an outflow tube 115C is provided at a position corresponding to the ink chamber 111C. The outflow tube 115C has a lower open end functioning as the ink outlet port 114C. The outflow tube 115C has an upper open end functioning as a connecting port 116C (see FIG. 4). An outflow tube 115M is provided at a position corresponding to the ink chamber 111M. The outflow tube 115M has a lower open end functioning as the ink outlet port 114M. The outflow tube 115M has an upper open end functioning as a connecting port 116M (see FIG. 4). An outflow tube 115K is provided at a position corresponding to the ink chamber 111K. The outflow tube 115K has a lower open end functioning as the ink outlet port 114K. The outflow tube 115C has an upper open end functioning as a connecting port 116K (see FIG. 4).

As illustrated in FIG. 5, the ink outlet port 114C is positioned in the ink chamber 111C. The ink outlet port 114C is positioned between right and left ends of the front wall 101C in the left-right direction 9. The ink outlet port 114M is positioned in the ink chamber 111M. The ink outlet port 114M is positioned between right and left ends of the front wall 101M in the left-right direction 9. The ink outlet port 114Y is positioned in the ink chamber 111Y. The ink outlet port 114Y is positioned between right and left ends of the front wall 101Y in the left-right direction 9. The ink outlet port 114K is positioned in the first space 121 of the ink chamber 111K. The ink outlet port 114K is positioned between right and left ends of the front wall 101K in the left-right direction 9.

While not illustrated in the drawings, the ink tank 100 may have an air communication passage(s) to provide communication of each ink chamber 111 with the outside of the tank 100. Further, the ink tank 100 may include a well-known detection mechanism to detect the level of the ink stored in each ink chamber 111.

Operational and Technical Advantages of the Embodiment

In the embodiment described above, the level of the black ink stored in the ink chamber 111K and the level of the yellow ink stored in the ink chamber 111Y are both visible from the front side of the multifunction peripheral 10. The same is true with respect to the remaining ink chambers 111C and 111M.

The ink chamber 111K has a rear portion (second space 122) that is positioned rearward of the rear end of the ink chamber 111Y, while the ink chamber 111K (first space 121) and the ink chamber 111Y have the same width as each other in the left-right direction 9 as viewed from the front side of the multifunction peripheral 10. With this structure, the volume V1 of the ink chamber 111K can be easily made greater than the volume V2 of the ink chamber 111Y. Since the volume V1 of the ink chamber 111K is greater than the volume V2 of the ink chamber 111Y, a larger amount of ink can be stored in the ink chamber 111K than in the ink chamber 111Y. Likewise, a greater amount of ink can be stored in the ink chamber 111K than in the ink chambers 111C and 111M, since the width of the ink chamber 111K is equal to the width of each ink chamber 111M, 111C in the left-right direction 9 as viewed from the front side of the multifunction peripheral 10.

Further, the second space 122 of the ink chamber 111K is positioned adjacent to and rearward of the first space 121 and the ink chamber 111Y. This structure can realize down-sizing of the ink tank 100 in the front-rear direction 8 as well as enlargement of the volume V1 of the ink chamber 111K. Similarly, since the second space 122 of the ink chamber 111K is positioned adjacent to and rearward of the ink chambers 111C, 11M, the ink tank 100 can be made compact in the front-rear direction 8 yet further increasing the volume V1 of the ink chamber 111K.

When viewed in the front-rear direction 8, the second space 122 of the ink chamber 111K extends in the left-right direction 9 to span across right and left ends of each partition portion 110Y, 110M, 110C. In other words, in the ink tank 100, an entire space behind the ink chambers 111Y, 111C and 111M can be utilized as the second space 122 (an extra space for storing black ink in the ink chamber 111K), in addition to the first space 121). With this structure, a larger space can be efficiently ensured for the second space 122 in the internal space of the ink tank 100.

Further, the second space 122 of the ink chamber 111K has an upper portion positioned above the upper limit indicator lines 138, and a lower portion positioned below the lower limit indicator lines 141. This structure can also contribute to efficient layout of the second space 122 relative to the internal space in the ink tank 100.

The ink outlet port 114K is positioned in the first space 121 of the ink chamber 111K at a position close to the front wall 101K. With this structure, even if the ink tank 100 is inclined frontward or rearward with respect to the horizontal direction, there would be little difference between the level of the black ink observed through the front wall 101K and the level of the black ink near the ink outlet port 114K.

In the depicted embodiment, the dimension of the first space 121 of the ink chamber 111K in the front-rear direction 8 is equal to the dimension of the ink chamber 111Y in the front-rear direction 8, based on an assumption that the thickness of the partition wall 110 is ignored from consideration. Further, the second space 122 of the ink chamber 111K is positioned adjacent to and rearward of the ink chamber 111Y. With these structures, the ink chambers 111K and 111Y can provide a high occupation rate relative to the space occupied by the ink tank 100 in the multifunction peripheral 10. Similarly, the ink chambers 111K, 111C, and 111M can provide a high occupation rate relative to the space occupied by the ink tank 100 in the multifunction peripheral 10, since the dimension in the front-rear direction 8 of the first space 121 of the ink chamber 111K is equal to those of the ink chambers 111C and 111M, and since the second space 122 of the ink chamber 111K is positioned adjacent to and rearward of the ink chambers 111C and 111M.

In the depicted embodiment, the ink chamber 111Y is positioned between the ink chamber 111M and the first space 121 of the ink chamber 111K in the left-right direction 9, and the outflow tube 115Y penetrates through the sub upper wall 140 defining the ink chamber 111Y. This structure enables ink to flow outside of the ink tank 100 through the outflow tube 115Y from the ink chamber 111Y which is enclosed on its right, rear and left sides by the ink chambers 111K and 111M except on the front side (the front side of the ink chamber 111Y is closed by the front wall 101Y). Similarly, since the ink chamber 111M is positioned between the ink chambers 111Y and 111C in the left-right direction 9 and the outflow tube 115M penetrates through the sub upper wall 140 defining the ink chamber 111M, ink is allowed to flow to the outside of the ink tank 100 through the outflow tube 115M from the ink chamber 111M which is enclosed on its right, rear and left sides by the ink chambers 111Y and 111C except on the front side (the front side of the ink chamber 111M is closed by the front wall 101M).

MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

According to the above-described embodiment, the first space 121 of the ink chamber 111K is positioned at the right end of the ink tank 100. However, as a modification, the first space 121 may be positioned at the left end of the ink tank 100. Still alternatively, the first space 121 may be arranged at a position other than at the left end or at the right end of the ink tank 100. For example, FIG. 7 illustrates an ink tank 200 according to a first modification to the embodiment. In the ink tank 200 according to the first modification, the four ink chambers 111 are arranged, from the left to the right, in order of the ink chamber 111C, the ink chamber 111M, the first space 121 of the ink chamber 111K, and the ink chamber 111Y. The second space 122 of the ink chamber 111K is positioned rearward of the ink chambers 111C, 111M, and 111Y. In this modification, the ink chamber 111K has a T-shaped cross-section, as illustrated in FIG. 7.

In the ink tank 200 according to the first modification, the partition wall 107 partitions the first space 121 of the ink chamber 111K and the ink chamber 111Y in the left-right direction 9. The partition wall 108 partitions the first space 121 of the ink chamber 111K and the ink chamber 111M in the left-right direction 9. The partition wall 109 partitions the ink chamber 111C and the ink chamber 111M in the left-right direction 9. The partition wall 110 is divided into two separate wall portions that are arranged opposite each other with respect to the first space 121 in the left-right direction 9. The wall portion on the left is connected to the rear ends of the partition walls 108 and 109, whereas the wall portion on the right is connected to the rear end of the partition wall 107.

In the above-described embodiment, the ink tank 100 has the four ink chambers 111. However, the number of the ink chambers 111 may be two or three, or may be not less than five.

Further, the second space 122 of the ink chamber 111K need not be positioned rearward of all the three other ink chambers 111C, 111M, 111Y. For example, in the arrangement of the four ink chambers 111 illustrated in FIG. 5, the second space 122 of the ink chamber 111K may be positioned adjacent to and rearward of the ink chamber 111Y only, and may not extend further leftward beyond the ink chamber 111Y. That is, the second space 122 may not be positioned rearward of the ink chambers 111M and 111C.

Further, the injection holes 112 may not be formed in the inclined wall 139, but may be formed in the sub upper wall 140. Further, the upper wall 104 of the ink tank 100 may not include the inclined wall 139. In this case, the upper end of the front wall 101 is connected to the front end of the sub upper wall 140.

Further, the ink tank 100 may not be an integrally molded product made from resin. For example, each ink chamber 111 may be independently constituted by a resin-based frame and a film. Specifically, as illustrated in FIG. 8, each of the four ink tanks 100K, 100Y, 100M, 100C may be defined by a resin frame having a right open end and a film fuse-bonded to the frame to cover the right open end. An ink tank 300 according to this modification is configured by combining these independently-formed four ink tanks 100K, 100Y, 100M, 100C as a set.

Further, the rear wall 106 of the ink tank 100 may be shaped differently. For example, as illustrated in FIG. 9, in an ink tank 400 according to a modification to the embodiment, the rear-left corner defined by the rear wall 106 and left wall 103 may be chamfered. Still alternatively, as illustrated in FIG. 10, a recessed portion 106A may be formed in the rear wall 106 in an ink tank 500 according to another modification to the embodiment. Since no ink channel (like the outflow tube 115K) is provided at the rear wall 106 in these ink tanks 400, 500 according to these variations, an enhanced degree of freedom can be obtained in designing the shape of the rear wall 106, mechanical interference between the rear wall 106 and those parts positioned rearward of the ink tank 400, 500 can be avoided, while the volume V1 of the ink chamber 111*k* can be made greater than the volumes V2, V3, and V4 of the ink chambers 111Y, 111M, and 111C.

Further, the types of the liquid stored in the respective ink chambers 111 may be distinguished by compositions of the ink, rather than by the colors of the ink. Further, the liquid of the disclosure need not be ink, but may be pretreatment liquid (which is ejected onto a sheet prior to ejection of ink for printing) or preservation liquid (which is sprayed onto a region near the nozzles 40 of the recording head 39 for protection against desiccation of the nozzles 40).

Further, the second space 122 of the ink chamber 111K may not extend in the left-right direction 9 to span between the right and left ends of each partition portion 110C, 110M, 110Y of the partition wall 110 defining the rear end of the ink chamber 111C, 111M, or 111Y. Still further, the second space 122 may not have an upper space positioned above the upper limit indicator lines 138, and/or a lower space positioned below the lower limit indicator lines 141.

The upper limit indicator lines 138 and the lower limit indicator lines 141 need not be lines, but may be configured as a display of symbols such as triangular marks or characters. Further, the upper limit indicator lines 138 and the lower limit indicator lines 141 need not be configured as protrusions or indentations on the outer surface of the front wall 101, but may be provided as printed matters or sheets affixed to the outer surface of the front wall 101.

What is claimed is:

1. A tank configured to store first liquid and second liquid to be supplied to a liquid consuming device, the tank comprising:

a first liquid chamber configured to store the first liquid, the first liquid chamber having a first volume;

a first front wall through which a liquid surface of the first liquid stored in the first liquid chamber is configured to be viewed from an outside of the tank;

a first upper wall extending rearward from the first front wall to cross the first front wall, the first upper wall having a first injection hole in communication with the first liquid chamber;

a second liquid chamber configured to store the second liquid, the second liquid chamber having a second volume;

a second front wall through which a liquid surface of the second liquid stored in the second liquid chamber is configured to be viewed from the outside of the tank; and a second upper wall extending rearward from the second front wall to cross the second front wall, the second upper wall having a second injection hole in communication with the second liquid chamber, wherein the first liquid chamber defines:

a first space aligned with the second liquid chamber in a left-right direction, the first space being defined at least by the first front wall and the first upper wall; and a second space in communication with the first space, the second space being arranged rearward of both the first space and the second liquid chamber, the second space being aligned with both the first space and the second liquid chamber in a front-rear direction, wherein the first liquid chamber has a rear end defined by a first rear wall opposing the first front wall in the front-rear direction, wherein the second liquid chamber has a rear end defined by a second rear wall opposing the second front wall in the front-rear direction, wherein the first rear wall of the first liquid chamber is positioned rearward of the second rear wall of the second liquid chamber in the front-rear direction, and wherein the first volume of the first liquid chamber is larger than the second volume of the second liquid chamber.

2. The tank according to claim 1, wherein, when viewed in the front-rear direction, the second space extends in the left-right direction to span across left and right ends of the second rear wall of the second liquid chamber.

3. The tank according to claim 1, wherein the first front wall is provided with an upper limit indicator indicating an upper limit of the liquid surface of the first liquid stored in the first liquid chamber, and wherein the second space has a portion that is positioned above the upper limit indicator.

4. The tank according to claim 1, wherein the first front wall is provided with a lower limit indicator indicating a lower limit of the liquid surface of the first liquid stored in the first liquid chamber, and wherein the second space has a portion that is positioned below the lower limit indicator.

5. The tank according to claim 1, wherein the first liquid chamber has a first outlet port through which the first liquid is to flow out of the first liquid chamber, the first outlet port being positioned in the first space.

6. The tank according to claim 5, wherein, when viewed in the front-rear direction, the first outlet port is positioned between left and right ends of the first front wall in the left-right direction.

7. The tank according to claim 1, wherein the second space is arranged adjacent to and rearward of the second liquid chamber in the front-rear direction.

8. The tank according to claim 7, wherein the first space and the second liquid chamber are partitioned by a first partition wall in the left-right direction, wherein the second space and the second liquid chamber are partitioned by a second partition wall in the front-rear direction, and wherein the first front wall, the second front wall, the first upper wall, the second upper wall, the first partition wall and the second partition wall are integrally molded with resin.

9. The tank according to claim 1, further comprising:

a third liquid chamber configured to store third liquid to be supplied to the liquid consuming device, the third liquid chamber having a third volume;

a third front wall through which a liquid surface of the third liquid stored in the third liquid chamber is configured to be viewed from the outside of the tank; and a third upper wall extending rearward from the third front wall to cross the third front wall, the third upper wall having a third injection hole in communication with the third liquid chamber, wherein the third liquid chamber is aligned with the second liquid chamber in the left-right direction, wherein the rear end of the first liquid chamber is positioned rearward of a rear end of the third liquid chamber, and wherein the first volume of the first liquid chamber is larger than the third volume of the third liquid chamber.

10. The tank according to claim 9, wherein the second space is positioned rearward of the third liquid chamber and is aligned therewith in the front-rear direction.

11. The tank according to claim 9, wherein the second liquid chamber is positioned between the first space and the third liquid chamber in the left-right direction, and wherein the second liquid chamber has a second outlet port through which the second liquid is to flow out of the second liquid chamber, the second outlet port being provided as an open lower end of a tube extending vertically in the second liquid chamber.

12. The tank according to claim 9, wherein the second space is arranged adjacent to and rearward of the second liquid chamber and the third liquid chamber in the front-rear direction.

13. The tank according to claim 9, wherein the first space is positioned at one end of the tank in the left-right direction.

14. The tank according to claim 9, wherein the first space and the second liquid chamber are partitioned by a first partition wall in the left-right direction, wherein the second space is partitioned by a second partition wall from the second liquid chamber and the third liquid chamber in the front-rear direction, wherein the second liquid chamber and the third liquid chamber are partitioned by a third partition wall in the left-right direction, and wherein the first front wall, the second front wall, the third front wall, the first upper wall, the second upper wall, the third upper wall, the first partition wall, the second partition wall, and the third partition wall are integrally molded with resin.

* * * * *